United States Patent [19]

Jung et al.

[11] Patent Number: 5,319,044

[45] Date of Patent: Jun. 7, 1994

[54] BRANCHED POLYMER CONTAINING SILYL GROUPS, A PROCESS FOR THE PREPARATION THEREOF, COATING AGENTS BASED ON THE POLYMER, AND THE USE THEREOF

[75] Inventors: Werner A. Jung, Ascheberg; Arno Schmitz, Nottuln, both of Fed. Rep. of Germany

[73] Assignee: BASF Lacke + Farben AG, Münster, Fed. Rep. of Germany

[21] Appl. No.: 850,648

[22] Filed: Mar. 13, 1992

Related U.S. Application Data

[63] Continuation of Ser. No. 335,206, May 2, 1989, abandoned.

[30] Foreign Application Priority Data

Sep. 10, 1986 [DE] Fed. Rep. of Germany .... 3630793.9

[51] Int. Cl.$^5$ ............................................. C08F 230/08
[52] U.S. Cl. .................. 526/279; 427/407.1; 525/326.5
[58] Field of Search ............. 427/421, 419.8, 402, 427/407.1; 526/279; 525/326.5

[56] References Cited

U.S. PATENT DOCUMENTS 4,499,151  2/1985  Dowbenko et al. ............ 427/407.1

FOREIGN PATENT DOCUMENTS 0075957  9/1982  United Kingdom .
0169536  7/1985  United Kingdom .

Primary Examiner—Joseph L. Schofer
Assistant Examiner—Wu C. Cheng
Attorney, Agent, or Firm—Kenyon & Kenyon

[57] ABSTRACT

A branched polymer containing silyl groups, a process for the preparation thereof, coating agents based on the polymer, and the use thereof.

The invention relates to polymers containing silyl groups, the silyl groups being introduced into the polymer through ethylenically unsaturated monomers of the general formula

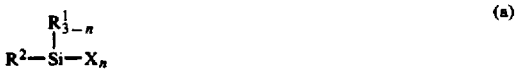

wherein
R$^1$ = alkyl, aryl, acyl or aralkyl having 1 to 10 carbon atoms,
R$^2$ = an organic radical having a polymerizable double bond,
X = a hydrolyzable group, and
n = 1, 2 or 3.

The polymers can be obtained by copolymerization of
a) 0.1 to 40% by weight of the silane monomers (a),
b) 5 to 30% by weight, preferably 8 to 25% by weight, of monomers containing at least 2 polymerizable, ethylenically unsaturated double bonds, and
c) 30 to 90% by weight of ethylenically unsaturated monomers without groups containing active hydrogen.

The invention also relates to moisture-hardening coating agents based on the polymers containing silyl groups. The coating agents are suitable, in particular, for automobile repair paintwork.

4 Claims, No Drawings

BRANCHED POLYMER CONTAINING SILYL GROUPS, A PROCESS FOR THE PREPARATION THEREOF, COATING AGENTS BASED ON THE POLYMER, AND THE USE THEREOF

This application is a continuation of application Ser. No. 07/335,206, filed May 2, 1989, now abandoned.

The invention relate to a polymer containing sily groups, the silyl groups being introduced into the polymer through ethylenically unsaturated monomers of the general formula

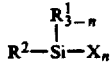  (a)

where
- $R^1$ = alkyl, aryl, acyl or aralkyl having 1 to 10 carbon atoms,
- $R^2$ = an organic radical having a polymerizable double bond,
- $X$ = a hydrolyzable group, and
- $n$ = 1, 2 or 3.

EP-A-158,161 discloses branched acrylate copolymers containing hydroxyl groups which are obtained by copolymerization of acrylates or methacrylates containing hydroxyl groups, monomers containing at least 2 polymerizable, olefinically unsaturated double bonds and further ethylenically unsaturated monomers. The branched acrylate copolymers can be combined with melamine-formaldehyde resins or with polyisocyanates to form a coating agent which can be hardened at low temperatures. The coating agents have good properties with regard to resistance to petroleum and long-term subjection to water or water vapor, these properties being attributable, in particular, to the branched structure of the acrylate copolymers.

EP-A-48,461 and EP-A-63,753 disclose vinyl resins which contain silyl groups to which a hydrolyzable radical is linked. The polymers containing silyl groups can be obtained, inter alia, through free-radical polymerization of silyl monomers of the general formula

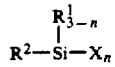  (a)

where
- $R^1$ = alkyl, aryl, acyl or aralkyl having 1 to 10 carbon atoms,
- $R^2$ = an organic radical having a polymerizable double bond,
- $X$ = a hydrolyzable group, and $n$ = 1, 2 or 3.

In addition, the polymers can be prepared by catalytic hydrosilylation at the double bonds of a polymer having olefinically unsaturated groups, Dissolved in an organic solvent, the resins described give one-component coating compositions which harden under the influence of moisture, even at low temperatures, when suitable hardening catalysts are used.

EP-A-63,817 discloses a metallic base coat which contains polymers containing silyl groups, the silyl groups being bonded to hydrolyzable groups, an acrylate resin and/or a cellulose compound and/or a reactive silicone component.

U.S. Pat. Nos. 4,499,150 and 4,499,151 disclose base coat/clear coat systems in which either the base coat, the clear coat or both the base and the clear coat contain polyaddition products with alkoxy- or acyloxysilane units. After brief drying, the base coat can be overpainted with the clear coat. According to these two patent specifications, all conventional monomers containing at least one double bond can be used for the polyacrylate. In the description and in the illustrative embodiments, only monomers containing an ethylenically unsaturated double bond are used for the preparation of the acrylate copolymers containing silyl groups.

EP-A-159,715 described a silicon polymer which is obtainable through polymerization of at least one ethylenically unsaturated monomer containing reactive, hydrolyzable silicone groups and a compound containing at least two ethylenically unsaturated groups, in the presence of a free-radical initiator or a polymerization regulator containing reactive silicon groups, The organic polymer used is, for example, a polyalkylene oxide containing reactive silicone groups. These reactive silicone groups are capable of undergoing condensation reactions in the presence of moisture and in the presence of suitable catalysts. The moisture-hardenable polymer described can be obtained, for example, by reacting 100 parts of the unsaturated monomer, 10 to 1,000 parts of the silicone polymer, 0.5 to 50 parts of the monomers containing at least two independent ethylenically unsaturated groups and 0.01 to 20 parts of the silicone regulator or the silicone initiator. If the proportion of polyfunctional monomer is too high, gelling occurs, and in addition the tendency towards gelling is dependent of both the regulator and the initiator content.

Under the reaction conditions mentioned, a graft reaction of the ethylenically unsaturated monomers onto the silicone resin present cannot be excluded. EP-A-159,715 states that if the proportion of polyfunctional monomers is too high, gelling of the product can occur.

The compositions described lead to improved tensile strength of the hardened polymer. A disadvantage of the composition described is that it is possible for a large number of undesired side reactions to occur. The publication mentioned does not indicate any relationship between the tendency towards gelling and the polymerization temperature.

EP-A-159,716 describes silicon resins which are prepared by polymerization of at least one unsaturated compound in the presence of an organic polymer containing reactive, hydrolyzable silicone groups and containing ethylenically unsaturated groups and at least one component from the group comprising silicon regulators or silicone initiators. The organic polymer is based, for example, on polyalkylene oxides. Together with ethylenically unsaturated monomers, compounds containing at least two ethylenically unsaturated double bonds can also be polymerized, silicone-modified monomers also being used. Gelling occurs if the proportion f ethylenically polyunsaturated monomers is too high, the polymerization temperature not being critical for the tendency towards gelling, according to the description in EP-A-159,716.

EP-A-169,536 described moisture-hardening systems based on a polymer containing at least one reactive silicone group per molecule and based on silanol compounds or compounds which can be hydrolyzed into silanols. During moisture hardening, the silicone groups of the polymer react with the silanol compound in a fashion such that some of the reactive silicone groups are no longer available as crosslinking points, but serve only for chain propagation. The composition described harden under the influence of moisture into an elastomeric material having good tensile strength and good surface properties. The compositions are preferably used as sealant materials.

The polymer containing at least one reactive silicone group per molecule can be formed by addition polymerization, monomers containing reactive silicon groups also being used. In this addition polymerization, monomers containing at least two ethylenically unsaturated double bonds can also be incorporated into the addition polymer. In the illustrative embodiments, these are used in the addition polymerization in a proportion of less than 4% by weight, relative to the total weight of the monomers. The improvement in elasticity of the coating obtained is attributable, in particular, to the addition of the silanol component.

The object of the present invention was to provide binders for moisture-hardening one-component coating agents, where the latter should harden at low temperature and the resultant coatings, compared to known moisture-hardening silicone resins, should have improved properties regarding petroleum-resistance and regarding resistance to long-term subjection to water or water vapor. It should be possible to form coating agents without problems and substantially avoiding side reactions.

The object of the invention is solved by a polymer, of the type mentioned initially, which contains silyl groups, wherein the polymer can be obtained by copolymerization of a) 0.1 to 40% by weight of the silane monomers (a),
b) 5 to 30% by weight, preferably 8 to 25% by weight, of monomers containing at least two polymerizable, ethylenically unsaturated double bonds, and
c) 30 to 90% by weight of ethylenically unsaturated monomers without groups containing an active hydrogen, where the sum of a), b) and c) is 100% by weight.

The silane monomers employed (component a) are ethylenically unsaturated monomers of the general formula

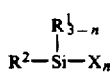

(component a)

where
R$^1$ = alkyl, aryl, acyl or aralkyl having 1 to 10 carbon atoms,
R$^2$ = an organic radical having a polymerizable double bond,
X = a hydrolyzable group, and
n = 1, 2 or 3.

The hydrolyzable group X can be, for example, a halogen radical, an alkoxy radical, an acyloxy radical, a mercapto radical or an alkenyloxy radical.

Suitable examples of the silane monomers are given below:

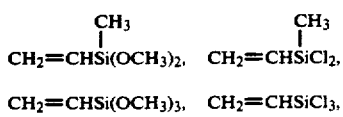

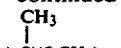
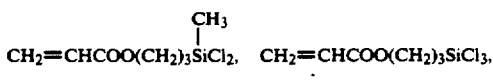
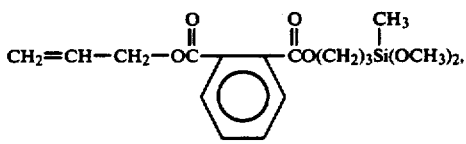
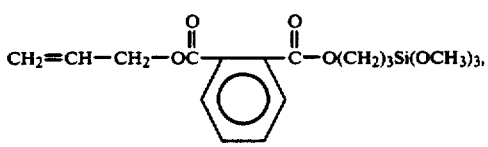
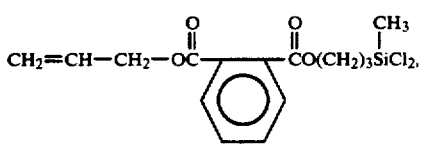
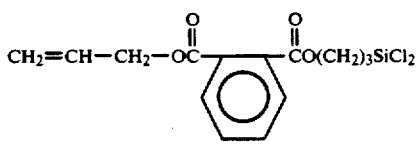

γ-Methacryloxypropyltrimethoxysilane is particularly preferably employed as component a).

Compounds of the general formula

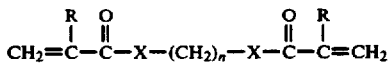

where
R = H, CH$_3$ or alkyl,
X = O, NH or S, and
n = 2 to 8, may advantageously be used as component b). Examples of such compounds are hexanediol diacrylate, hexanediol dimethacrylate, glycol diacrylate, glycol dimethacrylate, butanediol diacrylate, butanediol dimethacrylate, trimethylolpropane triacrylate and trimethylolpropane trimethacrylate. In addition, divinylbenzene is also suitable as component b). Of course, combinations of these polyunsaturated monomers can also be used.

In addition, component b) can advantageously be a polycarboxylic acid or unsaturated monocarboxylic acid which is esterified with an unsaturated alcohol containing a polymerizable double bond.

Furthermore, component b) used may advantageously be a product of the reaction of a polyisocyanate and an unsaturated alcohol or an amine. An example of this which may be mentioned is the product of the reaction of one mole of hexamethylene diisocyanate and two moles of allyl alcohol or the product of the reaction of isophorone diisocyanate and hydroxyethyl acrylate.

A further advantageous component b) is a diester of polyethylene glycol and/or polypropylene glycol having an average molecular weight of less than 1,500, preferably less than 1,000, and acrylic acid and/or methacrylic acid.

In addition, products of the reaction of a carboxylic acid containing a polymerizable, olefinically unsaturated double bond and glycidyl acrylate and/or glycidyl methacrylate, and products of the reaction of dicarboxylic acids with glycidyl acrylate and/or glycidyl methacrylate are suitable as component b). However, such ethylenically polyunsaturated monomers should only be employed in small amounts according to the invention since they contain hydroxyl groups, which can react with the silane monomers (a). This also applied to ethylenically polyunsaturated monomers which are formed from diepoxy compounds and ethylenically unsaturated monomers containing a primary or secondary amino group since these products likewise contain hydroxyl groups.

The choice of ethylenically unsaturated neutral monomers (component c) is not particularly critical. These may be selected from the group comprising styrene, vinyltoluene, alkyl esters of acrylic acid and methacrylic acid, alkoxyethyl acrylates and aryloxyethyl acrylates and the corresponding methacrylates, and esters of maleic and fumaric acid. Examples of these are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate. Other monomers may be employed so long as they do not lead to undesired properties of the copolymer.

In order to make possible more rapid water take-up during crosslinking under the influence of atmospheric moisture, it is particularly advantageous when, as an additional comonomer d) besides the ethylenically unsaturated monomers a), b) and c), up to 10% by weight, relative to the sum of a) to d), of an ethylenically unsaturated carboxamide are used.

Suitable components d) are, for example, acrylamide, methacrylamide, itaconamide, α-ethylacrylamide, crotonamide, fumaramide and maleimide.

If desired, up to 5% by weight of ethylenically unsaturated monomers containing a hydroxyl group, a carboxyl group or an amino group can also be used (component e). Examples of ethylenically unsaturated monomers containing hydroxyl groups are hydroxyalkyl esters of acrylic acid and/or methacrylic acid, for example hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Component e) may also be a product of the reaction of one mole of hydroxyethyl acrylate and/or hydroxyethyl methacrylate and an average of 2 moles of ε-caprolactone. Component e) can also be a hydroxyl group-containing ester of acrylic acid or of methacrylic acid which contains a secondary hydroxyl group, such as, for example, 2-hydroxypropyl acrylate, 2-hydroxybutyl acrylate, 3-hydroxybutyl acrylate and the corresponding methacrylates. A suitable polymerizable monomer containing hydroxyl groups is also a product of the reaction of acrylic acid and/or methacrylic acid with the glycidyl ester of a carboxylic acid containing a tertiary α-carbon atom. Examples of ethylenically unsaturated monomers containing a carboxyl group are methacrylic acid and acrylic acid. A suitable ethylenically unsaturated monomer containing an amino group is N-tert.-butylaminoethyl acrylate.

The copolymerization reactions for the preparation of the copolymers according to the invention are carried out using at least 2% by weight, relative to the total weight of the ethylenically unsaturated monomers, of a polymerization regulator without active OH or NH groups, preferred regulators being mercaptosilanes. It is apparent that, in many cases, only certain regulators are suitable for certain combinations of the monomers a) to e) to be polymerized.

If, for example, diacrylates or dimethacrylates of the general formula

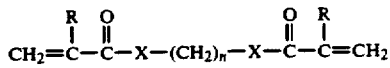

where
R = H. CH$_3$ or alkyl,
X = O, NH or S, and
n = 2 to 8,
are polymerized as component b) in a proportion of more than 10% by weight, relative to the total weight of all the monomers, the polymerization should be carried out using more than 5% by weight, relative to the total weight of the monomers, of mercaptoethyltriethoxysilane and/or mercaptopropylmethyldimethoxysilane, if appropriate together with other mercapto compounds, in a temperature range between 100° C. and 120° C.

If the abovementioned, ethylenically polyunsaturated acrylate or methacrylate compounds are copolymerized in a proportion of at least 15% by weight, relative to the weight of monomers, mainly acrylate monomers and/or methacrylate monomers and/or maleates and/or fumarates should be used as monomers without groups containing active hydrogen (component c)). The copolymerization should be carried out in the presence of more than 6% by weight, relative to the weight of monomers, of a mercaptosilane, preferably mercaptoethyltriethoxysilane or mercaptopropylmethyldimethoxysilane, if appropriate together with other mercapto compounds.

If more than 10% by weight of divinylaromatics, such as, for example, divinylbenzene, are copolymerized as component b) together with monomers a), c), if appropriate d) and if appropriate e), more than 10% by weight, relative to the weight of monomers, of mercaptoethyltriethoxysilane and/or mercaptopropylmethyldimethoxysilane should preferably be employed as regulators in order to prevent gelling of the copolymer.

The present invention also relates to a process for the preparation of the abovementioned polymers containing silyl groups.

The present invention also relates to a process for the preparation of a polymer containing silyl groups, where the silyl groups are introduced into the polymer through ethylenically unsaturated monomers of the general formula $$R^2-\underset{\underset{X_n}{|}}{\overset{\overset{R^1_{3-n}}{|}}{Si}}$$ (a)

where
- $R^1$ = alkyl, aryl, acyl or aralkyl having 1 to 10 carbon atoms,
- $R^2$ = an organic radical having a polymerizable double bond,
- X = a hydrolyzable group, and
- n = 1, 2 or 3, wherein, for its preparation,
a) 0.1 to 40% by weight of the silane monomers (a),
b) 5 to 30% by weight, preferably 8 to 25% by weight, of monomers containing at least two polymerizable, ethylenically unsaturated double bonds, and
c) 30 to 90% by weight of ethylenically unsaturated neutral monomers, where the sum of a), b) and c) is 100% by weight, are copolymerized in an organic solvent using initiators and using at least 2% by weight, relative to the total weight of the monomers, of polymerization regulators without OH and NH groups at 80° C. to 130° C., preferably at 90° C. to 120° C.

Examples of suitable ethylenically unsaturated monomers a) to c), and monomers d) and e) which can additionally be used if desired, are the abovementioned examples of components a) to e) of the polymer described containing silyl groups.

A precrosslinked, but ungelled copolymer can be obtained through suitable polymerization conditions.

Suitable initiators are preferably azo initiators, such as, for example, azobisisobutyronitrile. If a small amount of ethylenically polyunsaturated monomers (component b)) is employed, peroxy esters can also be used as initiators. An example of these which may be mentioned is tert.-butyl peroxy-2-ethylhexanoate. Of course, azo initiators containing reactive silicone groups can also be used. These are employed in an amount of 0.01 to 20 parts by weight per 100 parts by weight of the polymerizable monomers.

Examples of azo initiators containing reactive silicone groups which can be employed are given in EP-A-159,715 and EP-A-159,716.

The polymerization regulators used are preferably mercaptosilanes or mixtures of mercaptosilanes with other mercapto compounds. In this case, only those mercapto compounds which do not react with silyl groups, i.e. have no OH or NH groups, are suitable. Examples of suitable mercaptosilanes which can be employed as polymerization regulators are listed below:

(CH$_3$O)$_2$(CH$_3$)SiCH$_2$CH$_2$CH$_2$SH (CH$_3$CH$_2$O)$_3$SiCH$_2$CH$_2$SH

-continued (CH$_3$O)$_3$SiCH$_2$CH$_2$CH$_2$SH, (CH$_3$O)$_2$$\overset{\overset{CH_3}{|}}{Si}$CH$_2$CH$_2$CH$_2$SH, (CH$_3$CH$_2$O)$_3$SiCH$_2$CH$_2$CH$_2$SH, (CH$_3$CH$_2$O)$_2$$\overset{\overset{CH_3}{|}}{Si}$CH$_2$CH$_2$CH$_2$SH, (CH$_3$$\overset{\overset{O}{\|}}{C}$O)$_2$(C$_6$H$_5$)SiC$_8$H$_{16}$SH, (CH$_3$O)$_3$Si—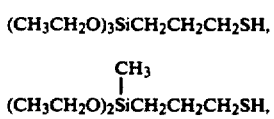—CH$_2$SH, Cl(CH$_3$)$_2$SiCH$_2$SH, (CH$_3$O)$_3$Si—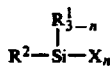—CH$_2$Br, ($\overset{\overset{CH_3}{\diagdown}}{\underset{\underset{CH_3}{\diagup}}{}}$CHO)$_3$SiCH$_2$CH$_2$CH$_2$Br,

[(CH$_3$O)$_3$SiCH$_2$CH$_2$CH$_2$S—]$_2$, $\left[ (CH_3O)_2\overset{\overset{CH_3}{|}}{Si}CH_2CH_2CH_2S- \right]_2$, $\left[ (CH_3O)_3Si-\bigcirc-S- \right]_2$, (CH$_3$O)$_2$SiO—$\overset{\overset{CH_3}{|}}{\underset{\underset{CH_3}{|}}{Si}}$—CH$_2$CH$_2$CH$_2$SH, $\left[ (CH_3O)_2SiO-\overset{\overset{CH_3}{|}}{\underset{\underset{CH_3}{|}}{Si}}CH_2CH_2CH_2S- \right]_2$.

Examples of other mercapto compounds are n- and t-dodecyl mercaptan.

Reactivity differences occur in the mercaptosilanes. The particularly preferred polymerization regulator is mercaptoethyltriethoxysilane.

The polymerization regulators are advantageously employed in an amount of at least 4% by weight, relative to the total weight of the monomers.

The free-radical polymerization is carried out at temperatures of 80°–130° C., preferably 90°–120° C. The free-radical polymerization for the preparation of the polymer containing silyl groups is advantageously carried out in a fashion such that a solution of the polymer having a solids content of 40–65% by weight results.

Suitable solvent for the free-radical polymerization are nonreactive solvents, such as, for example, esters, ethers, hydrocarbons, alcohols and ketones.

The present invention also relates to moisture-hardenable coating agents which contain the silyl group-containing polymer described above, organic solvent, if appropriate pigments, fillers and conventional auxiliaries and additives and also a crosslinking catalyst. The coating compositions have an adequately long potlife without addition of a crosslinking catalyst. If suitable crosslinking catalysts are added, the coating compositions rapidly harden with moisture at room temperature or slightly elevated temperature.

Suitable crosslinking catalysts are, for example, phosphoric acid, p-toluenesulfonic acid, dibutyltin dilaurate, dioctyltin dilaurate, amines, for example aliphatic diamines, such as ethylenediamine and hexanediamine, aliphatic polyamines, such as diethylenetriamine, triethylenetetramine and tetraethylenepentamine, alicyclic amines, such as piperidine and piperazine, aromatic amines, ethanolamine and triethylamine, furthermore alkali metal catalysts, such as, for example, potassium hydroxide or sodium hydroxide. In an advantageous fashion, 0.01 to 10 parts by weight of the catalyst are used per 100 parts by weight of the polymer.

Organotin compounds which can be employed as crosslinking catalysts and which may be mentioned are furthermore compounds containing tin/sulfur single or double bonds, such as, for example,

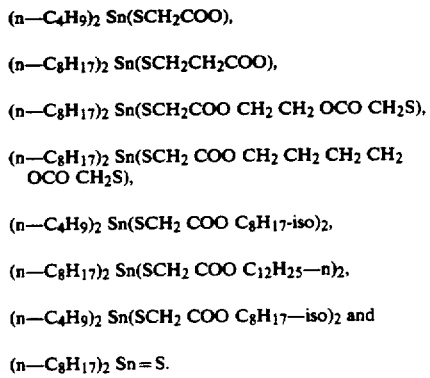

$(n-C_4H_9)_2 Sn(SCH_2COO)$, $(n-C_8H_{17})_2 Sn(SCH_2CH_2COO)$, $(n-C_8H_{17})_2 Sn(SCH_2COO\ CH_2\ CH_2\ OCO\ CH_2S)$, $(n-C_8H_{17})_2 Sn(SCH_2\ COO\ CH_2\ CH_2\ CH_2\ CH_2\ OCO\ CH_2S)$, $(n-C_4H_9)_2 Sn(SCH_2\ COO\ C_8H_{17}\text{-iso})_2$, $(n-C_8H_{17})_2 Sn(SCH_2\ COO\ C_{12}H_{25}\text{-n})_2$, $(n-C_4H_9)_2 Sn(SCH_2\ COO\ C_8H_{17}\text{-iso})_2$ and $(n-C_8H_{17})_2 Sn=S$.

Mixtures of the abovementioned tin/sulfur compounds with tin compounds, such as, for example, with dialkyltin dimaleates, are also suitable for the catalysis.

EP-A-48,461 and EPA-A-63,753 disclose further, likewise suitable catalysts.

The invention also relates to processes for the preparation of the coating agents described above, wherein the silyl group-containing polymer, an organic solvent, if appropriate pigments, fillers and additives are processed into a coating composition by mixing and, if appropriate, dispersing, and the composition is admixed with a crosslinking catalyst shortly before use.

Due to the low hardening temperatures, the coating agents described are suitable, in particular, for repair painting of automobile bodywork.

The coating agents according to the invention are likewise highly suitable as base coats containing pigments and/or metallic pigments or as top coats or as base and top coats of multilayer paintwork, which can be applied, if desired, by the two-coat wet-on-wet process.

The coating agents described have improved properties with regard to petroleum resistance and with regard to stability on long-term subjection to water or water vapor, compared to known silicone-modified copolymers.

The invention is described below in greater detail with reference to illustrative embodiments:

A) Preparation of the copolymers according to the invention

Unless otherwise stated, all percentage data in the following examples relate to parts by weight. The solids contents were determined in a circulation oven after 2 hours at 100° C. The viscosities were determined at 23° C. on a cone-plate viscometer (ICI viscometer).

The proportions of the individual monomers, amounts of solvent, amounts of initiator and regulator, the polymerization temperatures and the binder data can be seen from Table I. The acrylates are prepared in standard apparatuses (2-liter glass reactors) equipped with stirrers, reflux condensers and feed vessels. The solvent used was a 1:1 mixture of xylene and 1-methoxy-propyl-2-acetate. The solvent mixture was introduced into the flasks, and part was used for dissolving the initiator. The initiators used were 2,2'-azobis-(isobutyronitrile) =I1 and 2,2'-azobis(methylbutyronitrile) =I2. the following polymerization regulators were employed:

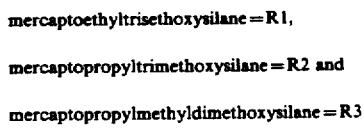

mercaptoethyltrisethoxysilane =R1, mercaptopropyltrimethoxysilane =R2 and mercaptopropylmethyldimethoxysilane =R3

The solvent mixture was heated to the polymerization temperature specified, and the temperature was maintained during the entire polymerization time. The monomer mixtures (including regulator) and initiator solutions specified were metered in separately.

The addition times were 3 hours for the monomer mixture (including regulator) and 3.5 hours for initiator solution, and the initiator feed was started 10 minutes after the monomer feed in Example 5, otherwise the two feeds were begun simultaneously; the feed took place uniformly over the specified time, and polymerization was continued at the polymerization temperature specified for a further 2 hours after the initiator feed was complete. The amounts of monomers, solvents etc. are specified in P=parts by weight.

TABLE I

| Example No. | 1 | 2 | 3 | 4 | 5 | 6 |
|---|---|---|---|---|---|---|
| Initial amount of solvent | 389.6P | 360.8P | 348.8P | 348.8P | 572.4 | 607.0P |
| γ-Methacryloxypropyltrimethoxysilane | 180.0P | 180.0P | 180.0P | 180.0P | 180.0P | 96.0P |
| Hexanediol diacrylate | 120.0P | 120.0P | 120.0P | 120.0P | 90.0P | — |
| Divinylbenzol (64% strength in ethylstyrene) | — | — | — | — | — | 84.0P |
| Methyl methacrylate | 180.0P | 180.0P | 180.0P | 60.0P | 90.0P | 180.0P |
| tert.-Butyl acrylate | 120.0P | 120.0P | 120.0P | 60.0P | 60.0P | — |
| Styrene | — | — | — | 120.0P | 120.0P | — |
| n-Butyl acrylate | 60.0P | 60.0P | 60.0P | 60.0P | 60.0P | — |
| 2-Ethylhexyl acrylate | — | — | — | — | — | 120.0P |
| Cyclohexyl methacrylate | — | — | — | — | — | 120.0P |
| Regulator | 88.8R2 | 60.0R1 | 48.0R2 | 57.0R2 | 54.0R2 | 90.0R1 |
| Initiator | 20.4 I1 | 20.4 I1 | 20.4 I1 | 20.4 I1 | 20.4 I2 | 21.0 I2 |
| Solvent for initiator | 319.6P | 319.6P | 319.6P | 319.6P | 102.0P | 104.0P |
| Polymerization temperature | 110° C. | 110° C. | 110° C. | 110° C. | 110° C. | 90° C. |
| Solids content | 48.5% | gelled | 49.6% | gelled | 48.5% | 48.7% |
| Visc. | 0.3 | | 2.2 | | 1.4 | 1.9 |

TABLE 1-continued

| Example No. | 1 | 2 | 3 | 4 | 5 | 6 |
|---|---|---|---|---|---|---|
| (dPa · s) | | | | | | |

The acrylate resins from Examples 3 and 6 were concentrated to a solids content of 64.4 (3) and 59.8% (6) by removing solvent mixture by distillation, and were employed in this form in the paints.

The copolymers of Examples 6, 8 and 10 were analyzed by gel-permeation chromatography. The following values were obtained:

| Example | $\overline{M}_n$ | $\overline{M}_w$ | $D = \dfrac{M_w}{M_n}$ |
|---|---|---|---|
| 6 | 2 830 | 60 000 | 21,2 |
| 8 | 3 000 | 80 000 | 26,3 |
| 10 | 3 500 | 95 000 | 26,9 |

| Example No. | 7 | 8 | 9 | 10 | 11 |
|---|---|---|---|---|---|
| Initial amount of solvent | 637.0P | 621.4P | 556.6P | 557.2P | 519.3P |
| γ-Methacryloxy-propyltrimethosy-silane | 60.0P | 60.0P | 180.0P | 180.0P | 180.0P |
| Hexanediol diacrylate | — | — | 120.0P | 120.0P | 120.0P |
| Divinylbenzene (64% strength in ethylstyrene) | 120.0P | 120.0P | — | — | — |
| Methyl methacrylate | 180.0P | 180.0P | 120.0P | 120.0P | 120.0P |
| tert.-Butyl acrylate | — | — | 120.0P | 108.0P | 84.0P |
| n-Butyl acrylate | — | — | 60.0P | 60.0P | 60.0P |
| 2-Ethylhexyl acrylate | 120.0P | 120.0P | — | — | — |
| Cyclohexyl methacrylate | 120.0P | 120.0P | — | — | — |
| Acrylamide | — | — | — | 12.0P | — |
| Acrylic acid/Card. adduct (48.8% strength in toluene)* | — | — | — | — | 73.5P |
| Regulator | 90.0R1 | 104.4R3 | 38.4R3 | 38.4R3 | 38.4R3 |
| Initiator | 21.0 I2 | 21.0 I2 | 20.4 I2 | 20.4 I2 | 20.4 I2 |
| Solvent for initiator | 104.0P | 104.0P | 102.0P | 102.0P | 102.0P |
| Polymerization temperature | 90° C. | 90° C. | 110° C. | 110° C. | 110° C. |

-continued

| Example No. | 7 | 8 | 9 | 10 | 11 |
|---|---|---|---|---|---|
| Solids content | gelled | 49% | 49% | 49.5% | 50.1% |
| Visc. (dPa · s) | | 2.0 | 1.55 | 2.8 | 3.8 |

*The acrylic acid/Cardura E 10 adduct was prepared as follows:
750 parts of Cardura E 10 (glycidyl ester of a branched C-10 carboxylic acid) and 988 parts of toluene were heated to 100° C. together with 0.988 parts of hydroquinone, and 238 parts of acrylic acid were metered in within 30 minutes. The mixture was kept at 100° C., 1 part of a chromium salt complex was added 2.5 hours after the acrylic acid addition, a further 0.1 parts of a chromium salt complex were added after a further 5 hours at 110° C., and an acid number of 18.5 (mg of KOH) was reached after a further 5 hours. The product had a solids content of 48.8%.

B) Preparation of paints according to the invention
Clear-coat composition[1]

| | Paint 1 | Paint 2 |
|---|---|---|
| Acrylate resin from Example 6 | 76 | — |
| Acrylate resin from Example 3 | — | 47 |
| Acrylate resin from Example 1 | — | 27 |
| Polysiloxane/polyether solution (0.006% strength) | 4 | 4 |
| Light-screen (HALS product)[2] | 1.2 | 1.2 |
| UV absorber (oxalanilide)[3] | 1 | 1 |
| Butyl glycol acetate | 2 | 2 |
| Butyl acetate | 14.3 | 16.3 |
| Dibutyltin dilaurate solution (10% strength in xylene) | 1.5 | 1.5 |
| | 100.0 | 100.0 |
| Paint thinner[4] | 27 g | 11 g |
| Spray viscosity (DIN 4 beaker) | 18 s | 18 s |
| Processing solids content (1 h/130° C.) | 36.5% | 40% |

[1]The positions are stirred successively with a dissolver.
[2]Tinuvin 292, Ciba Geigy
[3]Sanduvor VSU, Sandoz AG
[4]Xylene/butyl acetate/methoxypropyl acetate 1/1/1

TABLE 2

| | | Property level of the clear coats[1] | | | | | |
|---|---|---|---|---|---|---|---|
| | | Coat 1 | | | Coat 2 | | |
| | | RT | 30'/60° C. | 20'/80° C. | RT | 30'/60° C. | 20'/80° C. |
| Pendulum hardness according to König | 24 h | 35 | 64 | 70 | 10 | 11 | 11 |
| (DIN 53 157) | 168 h | 130 | 153 | 154 | 71 | 76 | 80 |
| (measured on glass, 40 μm) | 336 h | 134 | 167 | 171 | 136 | 154 | 154 |
| Touch-dry after | | 4 h | oven | oven | 8 | 6 | 6 |
| Adhesive tape test[2] | 24 h | slight mark | OK | OK | slight mark | OK | OK |
| Resistance to premium grade gasoline[3] after | 14 days | OK | OK | OK | slight mark | OK | OK |
| Glass (20°) | | 78% | 82% | 84% | 70% | 75% | 75% |
| Erichsen recess (mm) (DIN 53 156) | | 5 | 5 | 5 | 6 | 6 | 6 |
| Volvo test (10 circuits)[4] | | OK | OK | OK | bubbles | bubbles | OK |
| Processing solids content (18 seconds, DIN 4 beaker) | | 36.5% | | | 40% | | |

[1]The clear coats were applied in a coating thickness of 50 μm onto a polyester/melamine/aluminum foil base coat.
[2]Tesakrepp 4330 is struck to the film and removed again after 1 hour; assessment according to the mark.
[3]Commercially available premium gasoline.
[4]1 circuit: 4 hours storage at 50° C., 2 hours at 35° C. and 100% relative atmospheric humidity, 2 hours at 35° C. at 100% relative atmospheric humidity + 2 liters of SO₂ per 300 liters of air, 16 hours storage at −30° C.

What is claimed is:

1. A coating agent hardenable with moisture comprising:

1) a silyl group-containing polymer, the silyl groups being introduced into the polymer through ethylenically unsaturated monomers of the general formula:

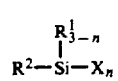

(a)

where $R^1$ = alkyl, aryl, acyl or aralkyl having 1 to 10 carbon atoms;

$R^2$ = an organic radical having a polymerizable double bond;

X = a hydrolyzable group, and n = 1, 2 or 3, obtained by copolymerization of:

a) 0.1 to 40% by weight of the silane monomer (a), b) 5 to 30% by weight of a monomer containing at least two polymerizable, ethylenically unsaturated double bonds, and c) 30 to 90% by weight of an ethylenically unsaturated monomer without groups containing active hydrogens, wherein the sum of a), b) and c) is 100% by weight;

2) a crosslinking catalyst and 3) an organic solvent.

2. A process for the preparation of the coating agent as claimed in claim 1 comprising admixing said crosslinking catalyst shortly before use.

3. A process for preparation of the coating agent as claimed in claim 1 comprising copolymerizing said monomers in an organic solvent containing an initiator and at least 2% by weight, relative to the total weight of monomers, a polymerization regulator without OH or NH groups at temperatures from about 80° to about 130° C.

4. The coating agent of claim 1 wherein said crosslinking catalyst is dibutyltin dilaurate.

* * * * *

UNITED STATES PATENT AND TRADEMARK OFFICE
CERTIFICATE OF CORRECTION

PATENT NO. : 5,319,044
DATED : JUNE 7, 1994
INVENTOR(S) : JUNG ET AL.

It is certified that error appears in the above-identified patent and that said Letters Patent is hereby corrected as shown below:

On the title page,
   item, [63] and column 1, line 8, change "May 2" to --May 3--;

Column 1, line 9, change "sily" to --silyl--;

Column 2, line 31, change "of" to --on--;

Column 2, line 57, change "f" to --of--;

Column 3 line 2, change "composition" to --compositions--;

Column 9, line 37, change "catalysis" to --catalysts--;

Column 10, line 49, change "benzo]" to --benzine--;

Column 11, line 26, change "propyltrimethosy-" to --propyltrimethoxy--;

Column 11, line 50, change "struck" to --stuck--;

Column 12, line 30, change "positions" to --compositions--.

Signed and Sealed this

Sixteenth Day of May, 1995

Attest:

BRUCE LEHMAN

Attesting Officer

Commissioner of Patents and Trademarks